United States Patent
Wu

(10) Patent No.: US 9,241,365 B2
(45) Date of Patent: Jan. 19, 2016

(54) METHOD OF HANDLING DEVICE TO DEVICE COMMUNICATION AND RELATED COMMUNICATION DEVICE

(71) Applicant: HTC Corporation, Taoyuan County (TW)

(72) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 131 days.

(21) Appl. No.: 14/098,500

(22) Filed: Dec. 5, 2013

(65) Prior Publication Data

US 2014/0155114 A1    Jun. 5, 2014

Related U.S. Application Data

(60) Provisional application No. 61/733,426, filed on Dec. 5, 2012, provisional application No. 61/842,976, filed on Jul. 4, 2013.

(51) Int. Cl.
*H04B 7/00* (2006.01)
*H04W 76/04* (2009.01)
*H04W 4/00* (2009.01)
(Continued)

(52) U.S. Cl.
CPC ............ *H04W 76/043* (2013.01); *H04W 4/008* (2013.01); *H04W 36/00* (2013.01); *H04W 76/023* (2013.01); *H04W 76/028* (2013.01); *H04W 76/064* (2013.01)

(58) Field of Classification Search
CPC ...... H04W 4/008; H04W 4/027; H04W 8/005

USPC ............ 455/509, 41.1–41.3, 515, 450, 422.1, 455/403, 550.1, 67.11, 500, 517, 516, 455/456.1–457, 423–425; 370/328, 329, 370/310, 216, 241, 338
See application file for complete search history.

(56) References Cited

U.S. PATENT DOCUMENTS

| 2004/0203381 A1* | 10/2004 | Cahn et al. ................... 455/41.2 |
| 2005/0062604 A1* | 3/2005 | Fong et al. ............... 340/539.23 |

(Continued)

FOREIGN PATENT DOCUMENTS

| EP | 2665325 A1 | 11/2013 |
| WO | 2013181421 A2 | 12/2013 |

OTHER PUBLICATIONS

European patent application No. 13020133.8, European Search Report mailing date: Apr. 1, 2014.
(Continued)

*Primary Examiner* — Keith Ferguson
(74) *Attorney, Agent, or Firm* — Winston Hsu; Scott Margo

(57) ABSTRACT

A method of handling device to device communication for a first user equipment (UE) in a wireless communication system includes establishing a Radio Resource Control (RRC) connection to a network of the wireless communication system; performing a proximity-based services (ProSe) communication with a second UE of the wireless communication system; and transmitting a first message to the network when the first UE detects a radio link failure in the ProSe communication; wherein the first message indicates the radio link failure to the network or requests changing to a UE-to-network communication mode from a ProSe communication mode.

6 Claims, 14 Drawing Sheets

(51) Int. Cl.
  *H04W 76/02* (2009.01)
  *H04W 76/06* (2009.01)
  *H04W 36/00* (2009.01)

(56) References Cited

U.S. PATENT DOCUMENTS

| | | |
|---|---|---|
| 2006/0165035 A1 | 7/2006 | Chandra |
| 2010/0227610 A1* | 9/2010 | Jabara et al. ............... 455/432.3 |
| 2011/0105102 A1* | 5/2011 | Jutzi et al. ..................... 455/419 |
| 2011/0117847 A1* | 5/2011 | Nakagawa ................... 455/41.2 |
| 2011/0228666 A1 | 9/2011 | Barbieri |
| 2012/0020213 A1 | 1/2012 | Horneman |

OTHER PUBLICATIONS

3GPP TR 22.803 V1.0.0 (Aug. 2012), "3rd Generation Partnership Project;Technical Specification Group SA; Feasibility Study for Proximity Services (ProSe) (Release 12)", p. 1-33.

3GPP TS 36.300 V11.3.0 (Sep. 2012), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", p. 1-205.

3GPP TS 36.321 V11.0.0 (Sep. 2012), "3rd Generation Partnership Project; Technical Specification Group Radio Access Network; Evolved Universal Terrestrial Radio Access (E-UTRA); Medium Access Control (MAC) protocol specification (Release 11)", p. 1-55.

3GPP TS 36.331 V11.1.0 (Sep. 2012), "3rd Generation Partnership Project; Technical Specification Group Radio Access Network; Evolved Universal Terrestrial Radio Access (E-UTRA); Radio Resource Control (RRC); Protocol specification (Release 11)",p. 1-325.

3GPP TS 36.331 V11.3.0 (Mar. 2013), "3rd Generation Partnership Project; Technical Specification Group Radio Access Network; Evolved Universal Terrestrial Radio Access (E-UTRA); Radio Resource Control (RRC); Protocol specification (Release 11)", p. 1-344.

GPP TR 23.703 V0.4.1 (Jun. 2013), "3rd Generation Partnership Project; Technical Specification Group Services and System Aspects; Study on architecture enhancements to support Proximity Services (ProSe) (Release 12)", p. 1-85.

European patent application No. 13020133.8, European application filing date: Dec. 5, 2013, European Search Report mailing date:Jul. 25, 2014.

Office action mailed on Aug. 1, 2014 for the European application No. 13020133.8, filing date Dec. 5, 2013, p. 1-18.

* cited by examiner

METHOD OF HANDLING DEVICE TO DEVICE COMMUNICATION AND RELATED COMMUNICATION DEVICE

CROSS REFERENCE TO RELATED APPLICATIONS

This application claims the benefit of U.S. Provisional Application No. 61/733,426, filed on Dec. 5, 2012 and entitled "Method and Apparatus for LTE UE to UE communication in a wireless communication system", and U.S. Provisional Application No. 61/842,976, filed on Jul. 4, 2013 and entitled "Method and Apparatus for handling device to device communication in a wireless communication system", the contents of which are incorporated herein in their entirety.

BACKGROUND OF THE INVENTION

1. Field of the Invention

The present invention relates to a method utilized in a wireless communication system and communication device thereof, and more particularly, to a method for handling device to device communication in a wireless communication system and communication device thereof.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNEs) for communicating with multiple user equipments (UEs), and communicating with a core network including a mobility management entity (MME), a serving gateway, etc., for Non-Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Please refer to FIG. 1, which is a schematic diagram of a wireless communication system 10 according to the prior art. The wireless communication system includes a network 100 and two UEs 102 and 104. The network 100 may include one or more eNBs 1002 and 1004 which connect the UEs 102 and 104, respectively. In an LTE or LTE-A system, when two UEs communicate with each other, their data path (user plane) goes via the network, even if the two UEs are in close proximity. For example, when the UE 102 needs to transmit data to the UE 104, the UE 102 sends data via the network 100 and the UE 104 receives data via the network 100. In other words, the network 100 receives data from the UE 102 and transmits data to the UE 104. Such procedure is similar to forwarding operation. The typical data path for this type of communication is shown in FIG. 1, where eNB(s) (e.g. eNBs 1002 and 1004) and/or gateways (e.g. serving gateway/packet data network gateway (SGW/PGW) 1000) are involved. UEs which perform this type of communication are said to be in a UE-to-eNB (i.e. UE-to-network) communication mode. However, when the UE 102 and the UE 104 are in close proximity, forwarding data through the network 100 is unnecessary, which wastes the radio resource and causes signal overhead in the network 100.

The specification of 3GPP Rel-11 defines that if UEs are in proximity of each other, they may be able to use a direct data path or a locally-routed data path to communicate with each other. The UEs which perform this type of communication, i.e. a Proximity-based Services (ProSe) communication or a device to device communication, are said to be in a ProSe communication mode or a UE-to-UE communication mode. In the direct data path, the user plane data between the UEs is not traversing any network node. Examples of the direct data path and the locally-routed data path are shown in FIG. 2 and FIG. 3, respectively.

However, there are some issues regarding the ProSe communication in the prior art. First, for a first UE communicating with a second UE each other via a ProSe communication in a data path and/or a control path and having a Radio Resource Control (RRC) connection to an eNB, the first UE may lose communication with the second UE due to radio link problems in the ProSe communication. These radio link problems may happen when, for example, the first UE moves out of transmission coverage of the second UE, or the first UE does not detect any transmission from the second UE. In these situations, the second UE may keep transmitting to the first UE without being aware of this radio link problem and thus drain unnecessary battery power.

Secondly, when a first UE is configured to perform a ProSe communication with a second UE and the first UE has an RRC connection with an eNB, the first UE may encounter a radio link failure or lose communication with the eNB while the first UE still has good radio link with the second UE. In this situation, the first UE may keep communicating with the second UE without the control of the eNB, which causes the first UE to waste power. In addition, the first UE may keep monitoring signal sent by the second UE but cannot receive scheduling command (e.g. uplink grant) from the eNB, which also causes the first UE to waste power. Moreover, the prior art does not deal with the ProSe communication when the first UE recovers the radio link with the eNB.

Thus, how to handle the device to device communication appropriately when a radio link problem occurs is a topic to be addressed and discussed in the industry.

SUMMARY OF THE INVENTION

The present invention therefore provides a method and related communication device for handling device to device communication so as to prevent the communication device from wasting unnecessary power due to a radio link problem.

The present invention discloses a method of handling device to device communication for a first user equipment (UE) in a wireless communication system. The method includes establishing a Radio Resource Control (RRC) connection to a network of the wireless communication system; performing a proximity-based services (ProSe) communication with a second UE of the wireless communication system; and transmitting a first message to the network when the first UE detects a radio link failure in the ProSe communication; wherein the first message indicates the radio link failure to the network or requests changing to a UE-to-network communication mode from a ProSe communication mode.

The present invention further discloses a method of handling device to device communication for a first user equipment (UE) in a wireless communication system. The method includes establishing a Radio Resource Control (RRC) connection to a network of the wireless communication system; performing a proximity-based services (ProSe) communication with a second UE of the wireless communication system; and changing to a UE-to-network communication mode from a ProSe communication mode when the first UE detects a radio link failure in the ProSe communication.

The present invention further discloses a method of handling device to device communication for a first user equipment (UE) in a wireless communication system. The method includes establishing a Radio Resource Control (RRC) connection to a first network of the wireless communication system; performing a proximity-based services (ProSe) communication with a second UE of the wireless communication system; initiating an RRC connection reestablishment procedure when a connection failure occurs in the RRC connection; and stopping or releasing the ProSe communication when the connection failure occurs in the RRC connection.

The present invention further discloses a method of handling device to device communication for a first user equipment (UE) in a wireless communication system. The method includes establishing a Radio Resource Control (RRC) connection to a network of the wireless communication system; performing a proximity-based services (ProSe) communication with a second UE of the wireless communication system; and suspending the ProSe communication when a connection failure occurs in the RRC connection with the network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
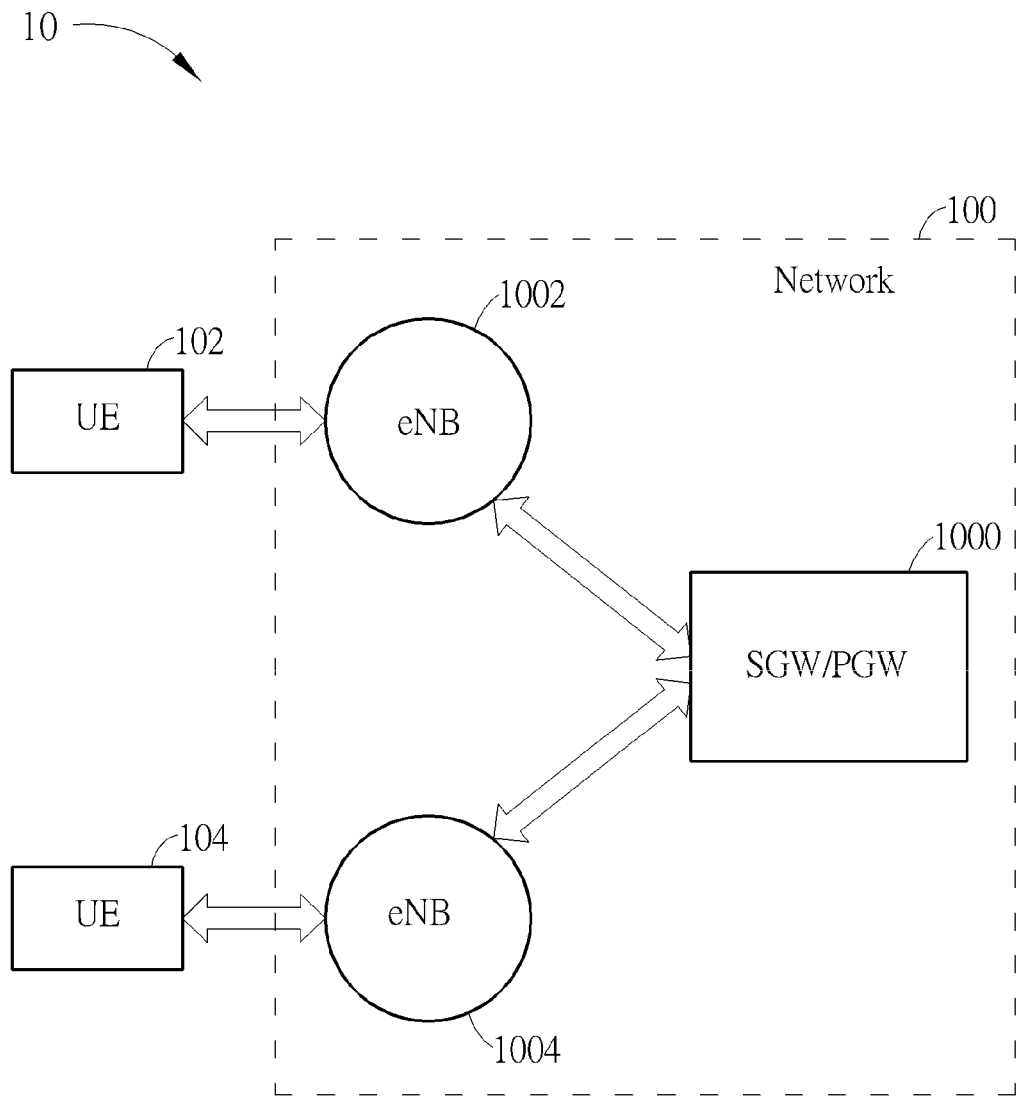
FIG. 1 is a schematic diagram of a wireless communication system according to an example of the prior art.
Figure 2:
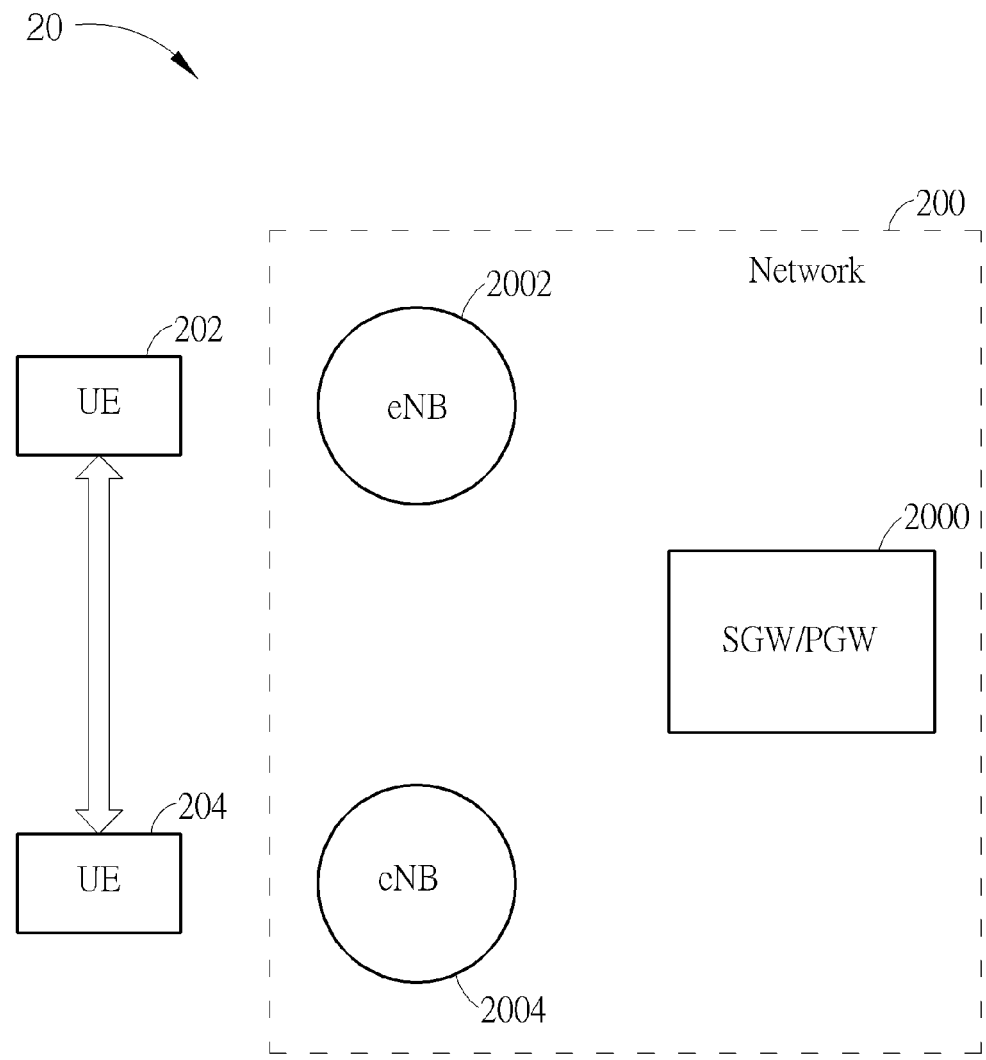
FIG. 2 is a schematic diagram of a wireless communication system according to an example of the prior art.
Figure 3:
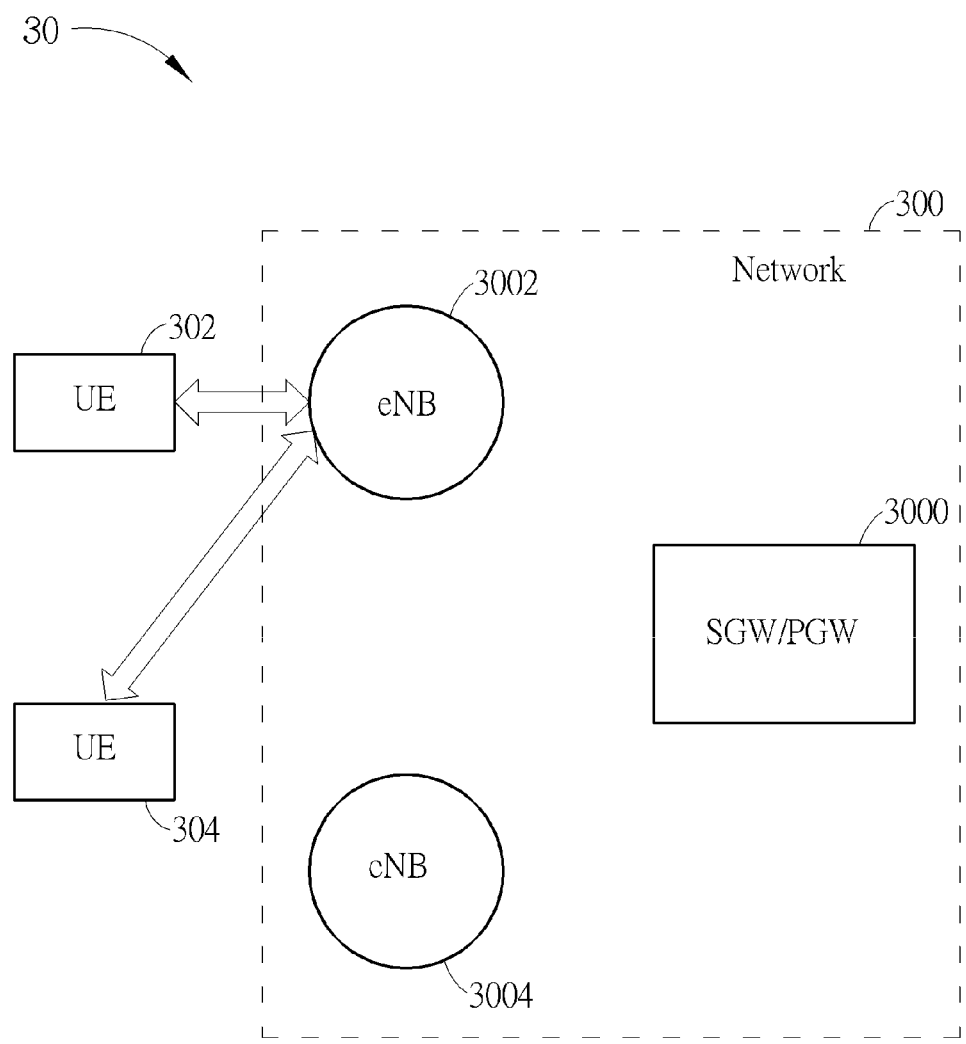
FIG. 3 is a schematic diagram of a wireless communication system according to an example of the prior art.
Figure 4:
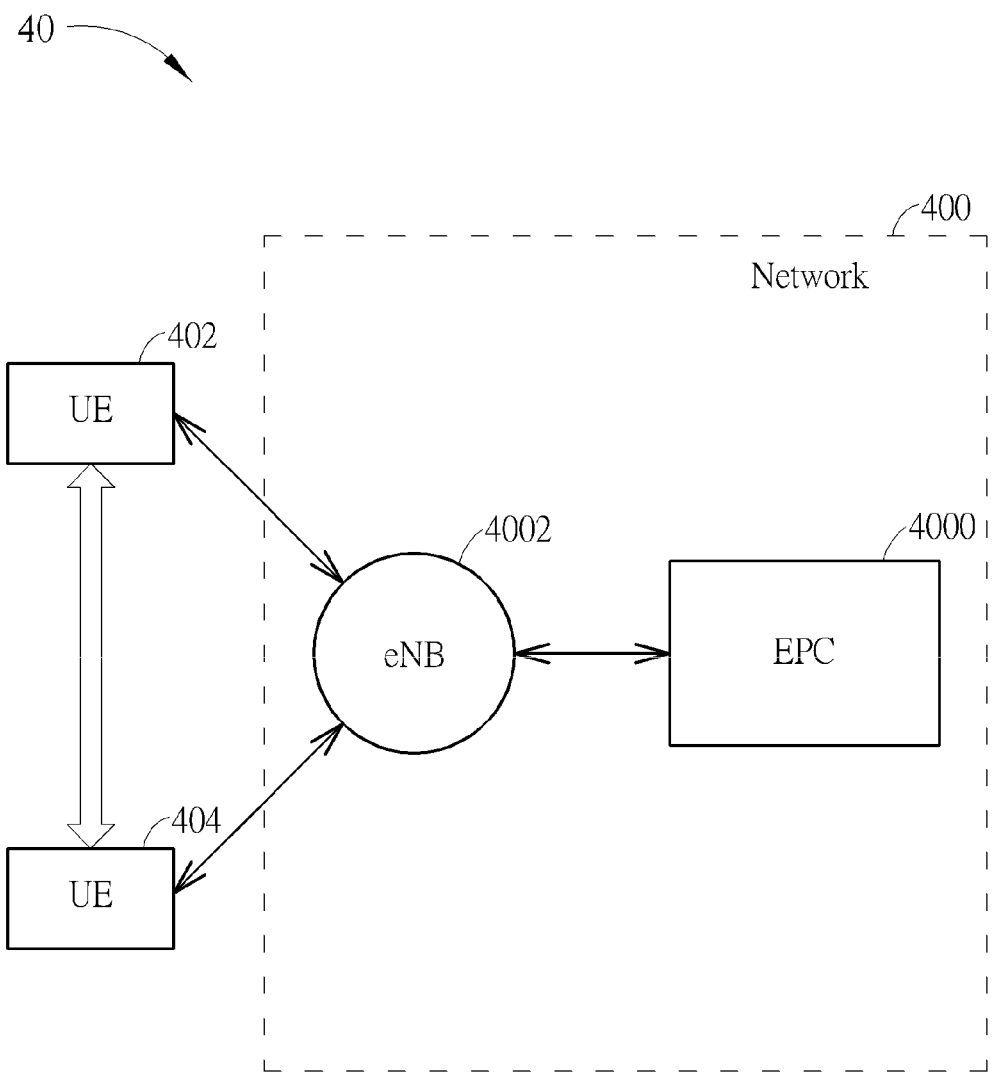
FIG. 4 is a schematic diagram of a wireless communication system according to an example of the present invention.

Please refer to FIG. 4, which is a schematic diagram of a wireless communication system 40 according to an example of the present invention. The wireless communication system 40 is briefly composed of a network 400 and user equipments (UEs) 402 and 404. In FIG. 4, the network 400 and the UEs 402 and 404 are simply utilized for illustrating the structure of the wireless communication system 40. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The UEs can be portable communication devices for performing speech and data communication through the network such as the UMTS, the LTE system or the LTE-A system. Besides, the network and one of the UEs can be seen as a transmitter or a receiver according to transmission direction, e.g., for an uplink (UL), the communication device is the transmitter and the network is the receiver, and for a downlink (DL), the network is the transmitter and the communication device is the receiver.

Figure 5:
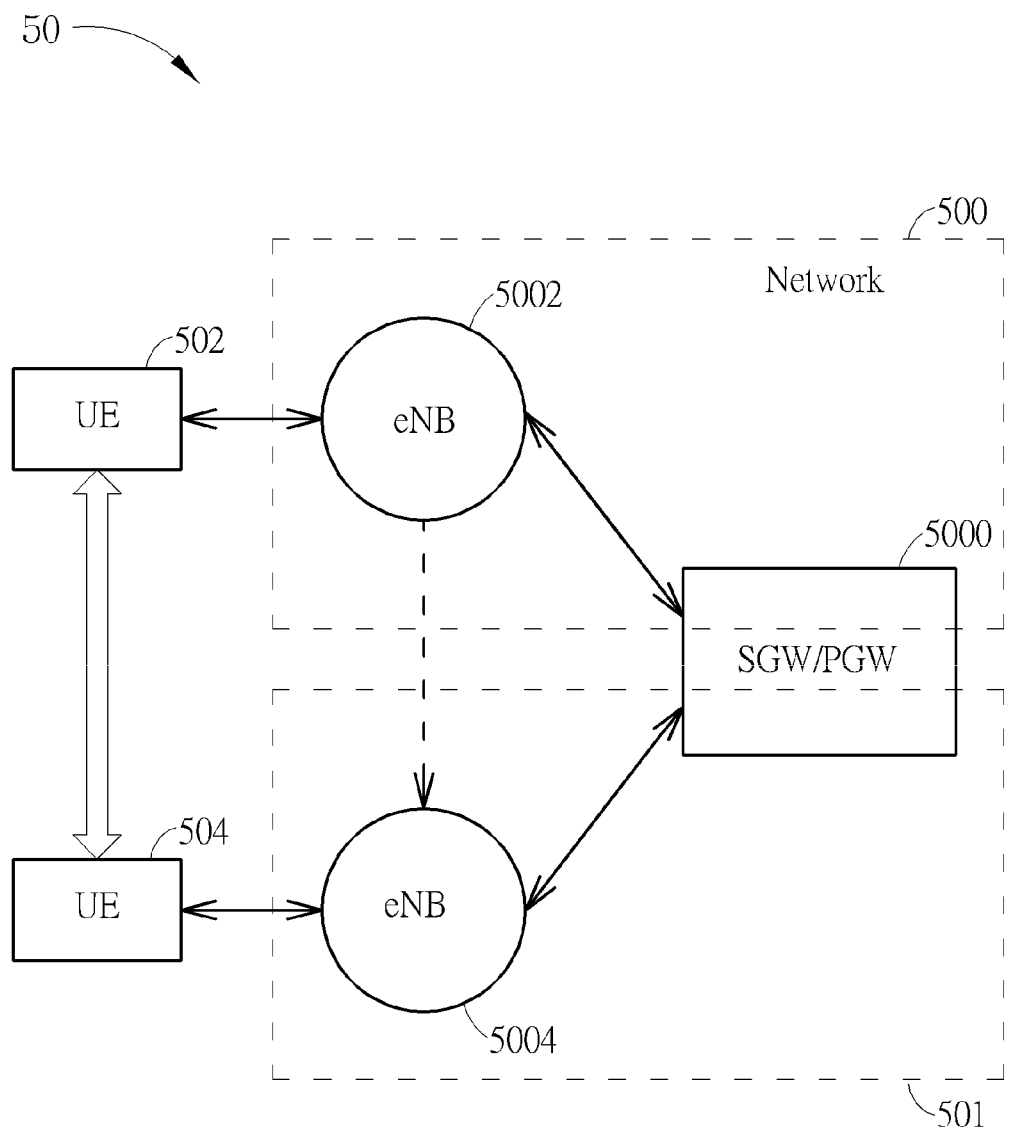
FIG. 5 is a schematic diagram of a wireless communication system according to an example of the present invention.

Note that the base station (e.g. eNB) to which the UEs are connected is not limited to only one base station. In the example of FIG. 4, the UEs 402 and 404 connect with the same eNB 4002 in the network 400. In another example such as FIG. 5, the UEs 502 and 504 may connect with eNBs 5002 and 5004 respectively in the network 500.

Figure 6:
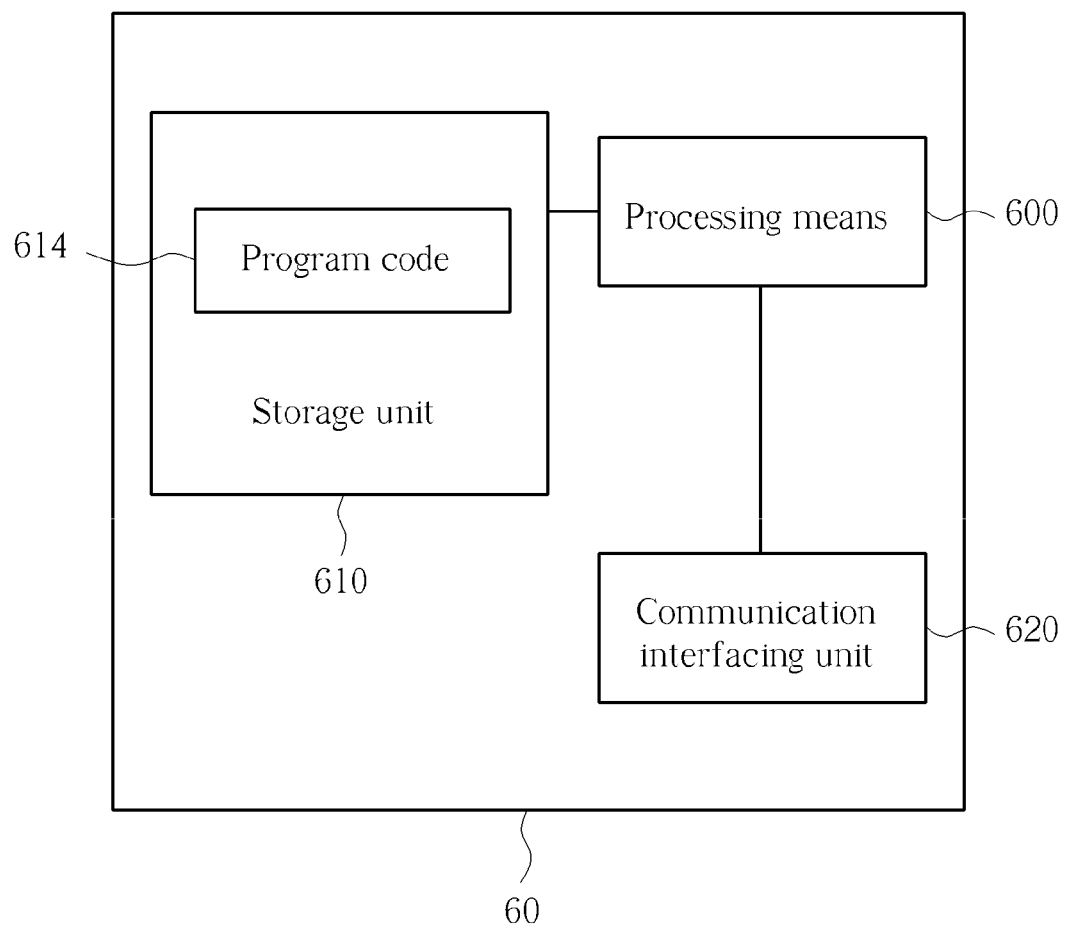
FIG. 6 is a schematic diagram of a communication device according to an example of the present invention.

Please refer to FIG. 6, which is a schematic diagram of a communication device 60 according to an example of the present invention. The communication device 60 can be the network or one of the UEs shown in FIG. 4 and FIG. 5, but is not limited herein. The communication device 60 may include a processing means 600 such as a microprocessor or Application Specific Integrated Circuit (ASIC), a storage unit 610 and a communication interfacing unit 620. The storage unit 610 may be any data storage device that can store a program code 614, accessed and executed by the processing means 600. Examples of the storage unit 610 include but are not limited to read-only memory (ROM), flash memory, random-access memory (RAM), CD-ROM/DVD-ROM, magnetic tape, hard disk and optical data storage device. The communication interfacing unit 620 is preferably a transceiver and is used to transmit and receive signals (e.g., messages or packets) according to processing results of the processing means 600.

Figure 7:
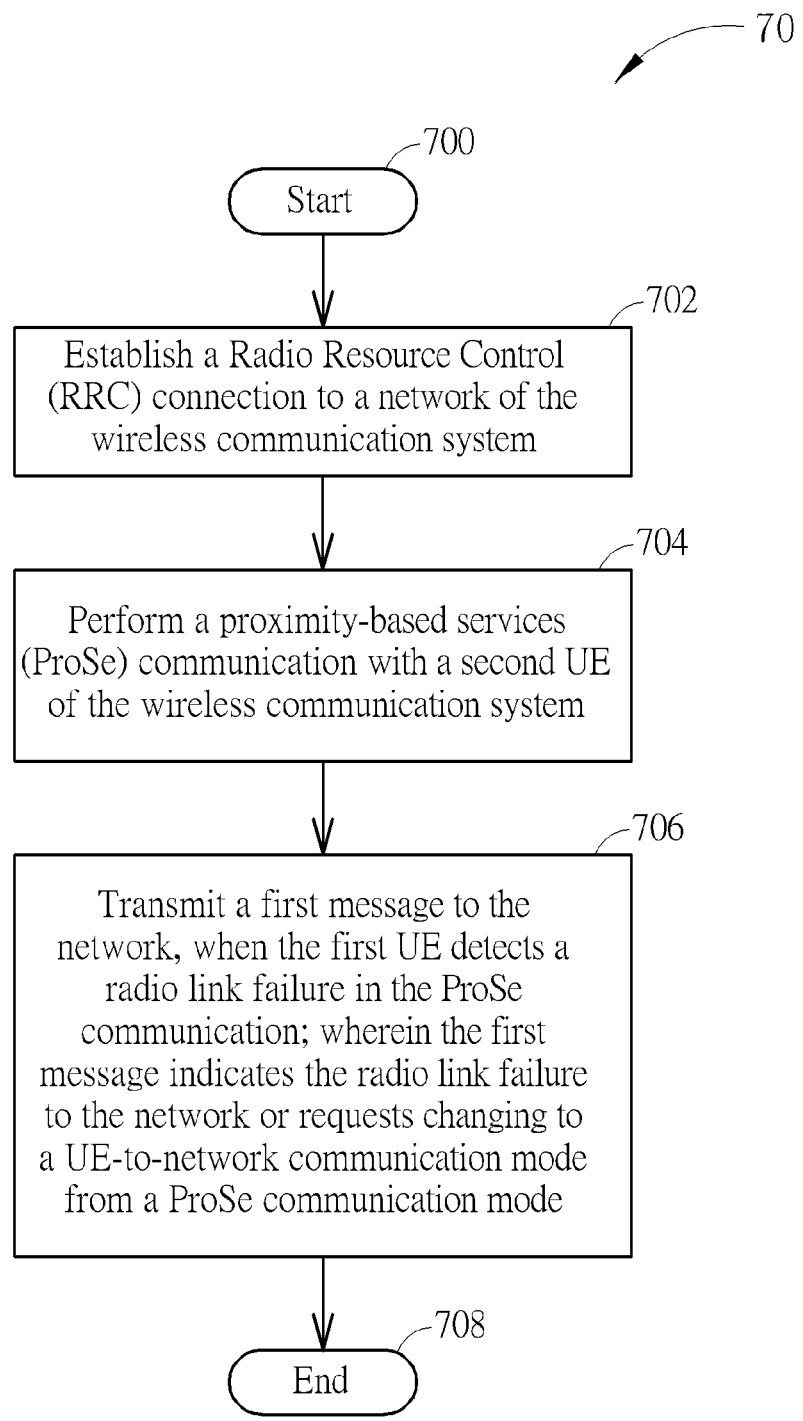
FIG. 7 is a flowchart of a process according to an example of the present invention.

Please refer to FIG. 7, which is a flowchart of a process 70 according to an example of the present invention. The process 70 is utilized for a first UE to handle direct communications, such as device-to-device communications or ProSe communications of direct data path type (which is called ProSe communication in short), in the wireless communication system 40 or 50. The process 70 may be performed by the communication device 60 and may be compiled into the program code 614 to instruct the processing means 600 to execute the following steps:

Step 700: Start.

Step 702: Establish a Radio Resource Control (RRC) connection to a network of the wireless communication system.

Step 704: Perform a proximity-based services (ProSe) communication with a second UE of the wireless communication system.

Step 706: Transmit a first message to the network, when the first UE detects a radio link failure in the ProSe communication; wherein the first message indicates the radio link failure to the network or requests changing to a UE-to-network communication mode from a ProSe communication mode.

Step 708: End.

According to the process 70, the first UE (e.g. UE 402) establishes an RRC connection to a network (e.g. eNB 4002) and performs a ProSe communication with a second UE (e.g. UE 404); that is, UE 402 and UE 404 are in a ProSe communication mode. When the UE 402 detects a radio link failure occurs in the ProSe communication, it transmits a first message to the eNB 4002 through the RRC connection, which indicates that there is a radio link problem in the ProSe communication or requests changing to a UE-to-eNB communication mode from the ProSe communication mode. The first message can be an RRC message, a MAC Control Element, or a physical layer signaling. In this way, the network 400 can be informed and make necessary adjustment such as stopping or not scheduling the transmission of the UEs when the UE 402 loses communication with the UE 404 due to a radio link problem. Thus, the UEs may be prevented from wasting unnecessary power.

Furthermore, when the eNB 4002 receives the first message, the eNB transmits a second message to the UE 402 to configure or indicate the UE 402 to stop using the ProSe communication, i.e. de-configure the ProSe communication release the ProSe communication, or release the RRC connection of the UE 402 (i.e. to put the UE 402 in an idle mode). When the ProSe communication is de-configured or released, the UE 402 transmits/receives data and/or control signaling only to/from the eNB 4002. Moreover, the UE 402 may perform a random access procedure or a scheduling request procedure to the eNB 4002 so as to obtain radio resource for transmitting the first message to the eNB 4002. The first message may be an RRC message containing a cause value indicating the radio link failure in the ProSe communication.

The radio link failure in the ProSe communication may be caused by several reasons. For example, it may be caused from one of the UEs 402 and 404 moving out of the transmission coverage of the other UE for a specific period. The UE 402 may detect that it moves out of the transmission coverage of the UE 404 and thereby determines that a radio link failure occurs in the ProSe communication. In another example, the UE 402 may detect that it has not received data (e.g. Medium Access Control Protocol Data Units (MAC PDUs)) or control signal from the UE 404 for a specific period and thereby determines that a radio link failure occurs in the ProSe communication. The control signal may be a synchronization signal of the ProSe communication, a Demodulation Reference Signal (DM-RS), or a user equipment specific reference signal designed for the ProSe communication for measurement, transmission timing adjustment, phase estimation, channel quality estimation for CQI reporting or coherent detection, or an acknowledgement or negative acknowledgement.

The synchronization signal of the ProSe communication may be in a different subframe from the Primary synchronization signal (PSS) and the Secondary synchronization signal (SSS) used for the UE-to-network communication mode. Alternatively, the synchronization signal of the ProSe communication may be in the same radio frame as the PSS or the SSS but is put in a different position (e.g. different subframe) in the subframe from the positions of the PSS or the SSS or is in an Orthogonal Frequency Division Multiple Access (OFDM) symbol different from the PSS and the SSS used in the UE-to-network communication mode, to avoid confusing other UEs. If the synchronization signal of the ProSe communication is designed as the one in the UE-to-eNB communication, the other UEs may detect the synchronization signal, think the synchronization signal is sent by a cell and try to camp on the cell but actually the cell does not exist. The DM-RS or the UE specific reference signal designed for the ProSe communication may be same or different from those designed for the UE-to-eNB communication. A benefit of a different design for control signals of ProSe communication and UE-to-eNB communication is to avoid other UEs detecting them.

In another example, the network may schedule all the UEs in the wireless communication system to perform the ProSe communication only in one or more predetermined subframe (s), e.g. the $1^{st}$ subframe of every n radio frame(s), where n is a positive integer. Thus, a first UE in Step 704 may perform the ProSe communication with a second UE during the predetermined subframe in a manner similar to broadcast. In such a case, the UE 402 may detect that it has not received any MAC PDU, a specific MAC PDU, or a feedback (such as an acknowledgement or negative acknowledgement) of the ProSe communication from other UEs for a certain period, thereby determines the radio link failure in the ProSe communication occurs. Upon detecting the radio link failure in the ProSe communication, the UE 402 may transmit the first message to the network.

Note that, one of the objectives of the present invention is to prevent the UEs from wasting power due to a radio link failure in ProSe communication, and the process 70 is an example of the present invention. Those skilled in the art should readily make combinations, modifications and/or alterations on the abovementioned description and examples. In the process 70, the first UE transmits a first message indicating the radio link failure in ProSe communication to the network or requesting changing to the UE-to-network communication mode from a ProSe communication mode. When the network receives the first message, the network transmits a second message to change to UE-to-network communication mode from a ProSe communication mode. The UE may stop Prose transmission due to the radio link failure before receiving the second message.

Figure 8:
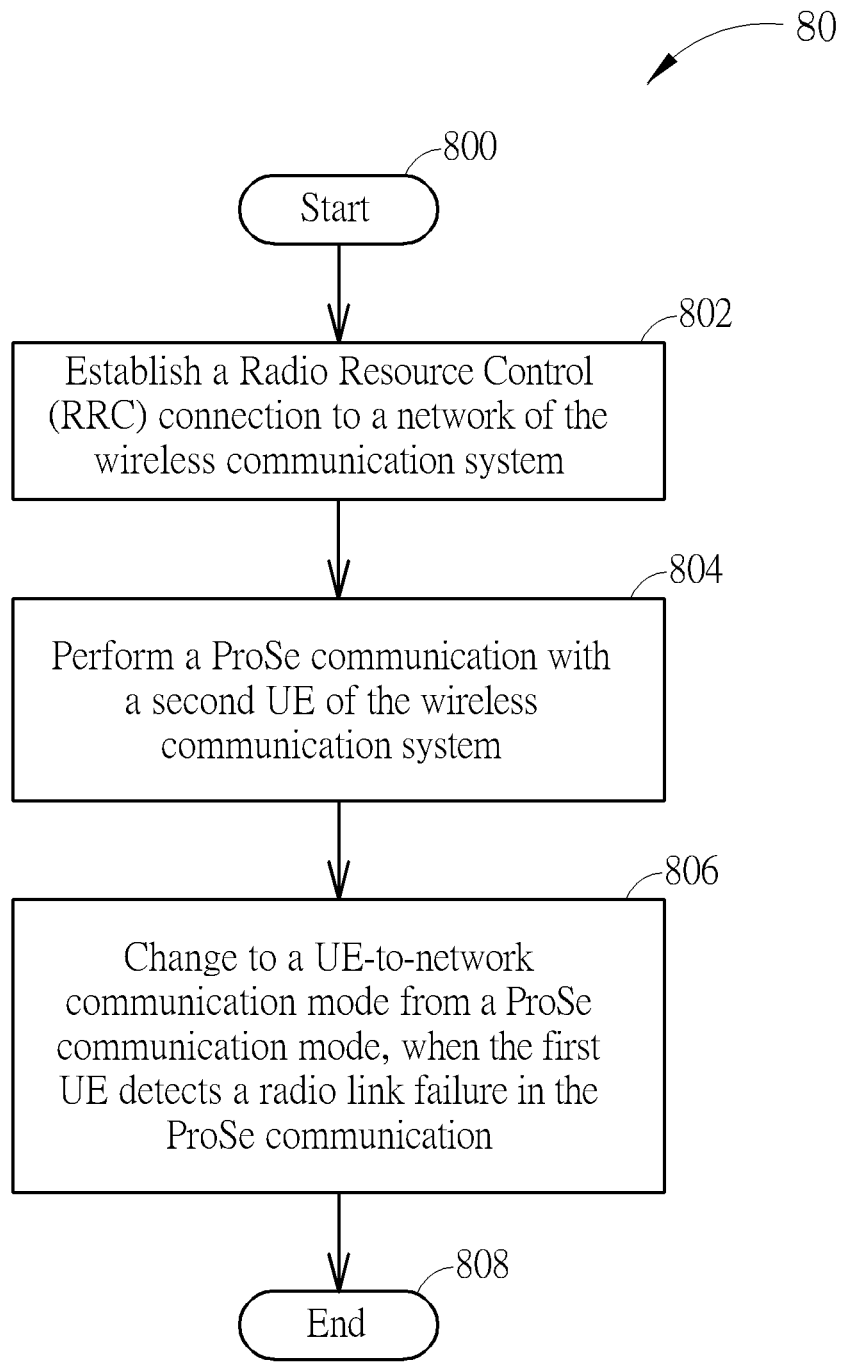
FIG. 8 is a flowchart of a process according to an example of the present invention.

In another example, the first UE may initiate changing to the UE-to-network communication mode by itself. The UE may stop transmission due to the radio link failure by itself. Please refer to FIG. 8, which is a flowchart of a process 80 according to an example of the present invention. The process 80 is utilized for a first UE to handle device-to-device communications or ProSe communications of direct data path type (which is called ProSe communication in short) in the wireless communication system 40 or 50. The process 80 is implemented by the communication device 60 and may be compiled into the program code 614 to instruct the processing means 600 to execute the following steps:

Step 800: Start.

Step 802: Establish a Radio Resource Control (RRC) connection to a network of the wireless communication system.

Step 804: Perform a ProSe communication with a second UE of the wireless communication system.

Step 806: Change to a UE-to-network communication mode from a ProSe communication mode, when the first UE detects a radio link failure in the ProSe communication.

Step 808: End.

According to the process 80, the first UE (e.g. UE 402) establishes an RRC connection to a network (e.g. eNB 4002) and performs a ProSe communication with a second UE (e.g. UE 404); that is, UE 402 and UE 404 are in a ProSe communication mode. When the UE 402 detects a radio link failure occurs in the ProSe communication, the UE 402 changes its communication mode from a ProSe communication mode to a UE-to-eNB communication mode. Thus, the UEs are prevented from wasting unnecessary power due to staying in the ProSe communication mode while a radio link failure occurs.

Furthermore, after the UE 402 changes to the UE-to-network communication mode from the ProSe communication mode, the UE 402 may transmit a message indicating a mode change to the network 400 such that the network 400 may appropriately rearrange the radio resource for the UEs. The UE 402 may perform a random access procedure or a scheduling request procedure to the network 400 so as to obtain radio resource for transmitting the message indicating a mode change. In order to change to the UE-to-network communication mode from the ProSe communication mode, the UE 402 may stop the ProSe communication first, release the ProSe communication with the UE 404 or release its RRC connection with the network 400, and then transmit/receive data or control signaling only to/from network. The radio link failure in the ProSe communication may be caused from the UE 402 moving out of a transmission coverage of the UE 404 for a period or the UE 402 cannot receive data or control signaling from the UE 404 for a specific period, which is described as above and omitted herein.

In another example, the network may schedule all the UEs in the wireless communication system to perform the ProSe communication only in one or more subframe(s), e.g. the $1^{st}$ subframe of every n radio frame, where n is a positive integer. The UEs may perform ProSe communication with each other during the predetermined subframe in a manner similar to broadcast. In such a case, the UE 402 may detect that it has not received any MAC PDU, a specific MAC PDU, an ACK or a feedback of the ProSe communication from other UEs for a certain period, thereby determines the radio link failure of the ProSe communication. Upon detecting the radio link failure of the ProSe communication, the UE 402 may change to the UE-to-network communication mode from the ProSe communication mode. Note that, when the radio resources for ProSe communications are scheduled in predetermined subframes, the UE does not necessarily transmit the message indicating the mode change to the network.

Figure 9:
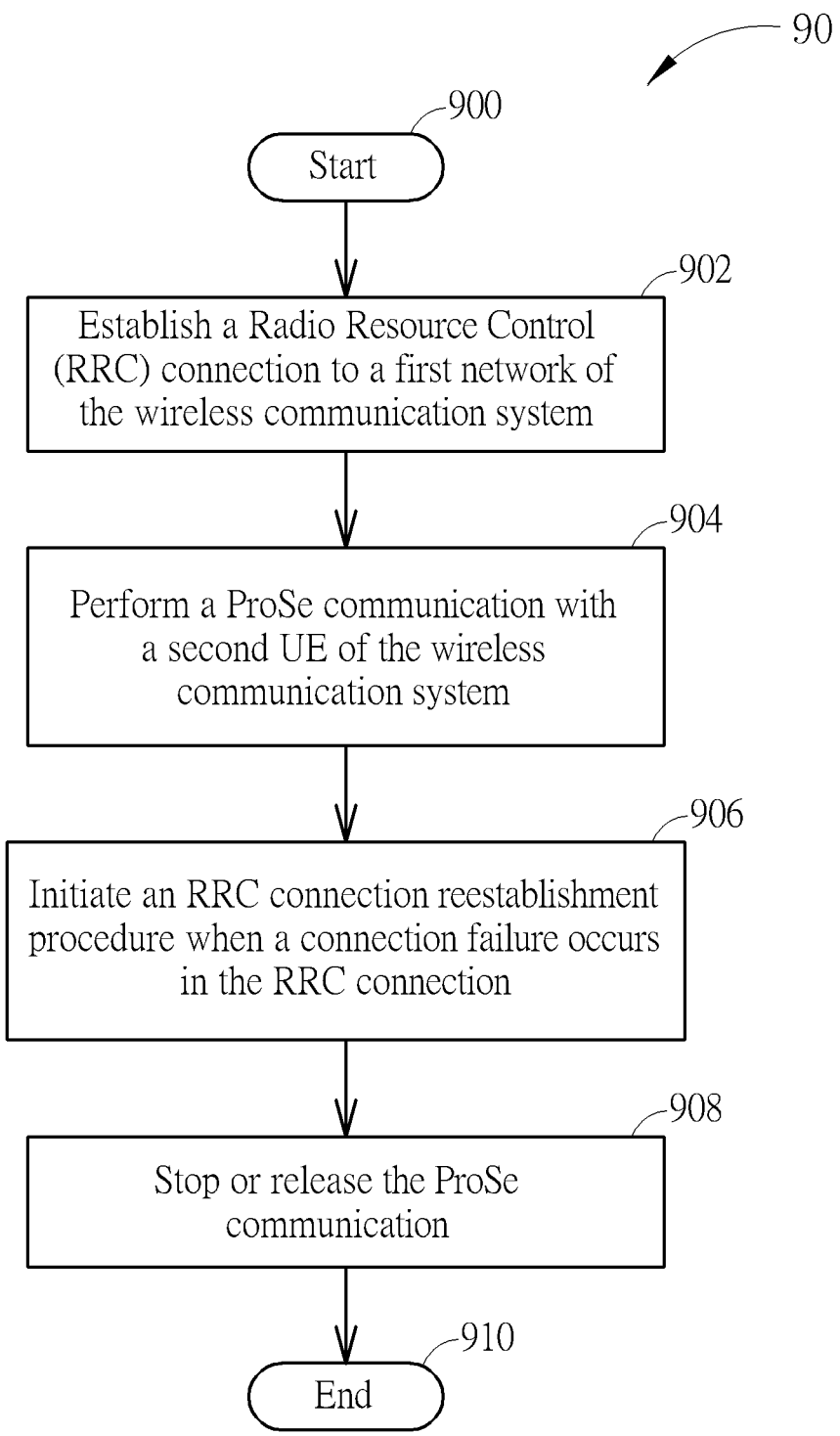
FIG. 9 is a flowchart of a process according to an example of the present invention.

Please refer to FIG. 9, which is a flowchart of a process 90 according to an example of the present invention. The process 90 is utilized for a first UE to handle direct communications, such as device-to-device communications or ProSe communications of direct data path type (which is called ProSe communication in short) in the wireless communication system 40 or 50. The process 90 is implemented by the communication device 60 and may be compiled into the program code 614 to instruct the processing means 600 to execute the following steps:

Step 900: Start.

Step 902: Establish a Radio Resource Control (RRC) connection to a first network of the wireless communication system.

Step 904: Perform a ProSe communication with a second UE of the wireless communication system.

Step 906: Initiate an RRC connection reestablishment procedure when a connection failure occurs in the RRC connection.

Step 908: Stop or release the ProSe communication.

Step 910: End.

Figure 10:
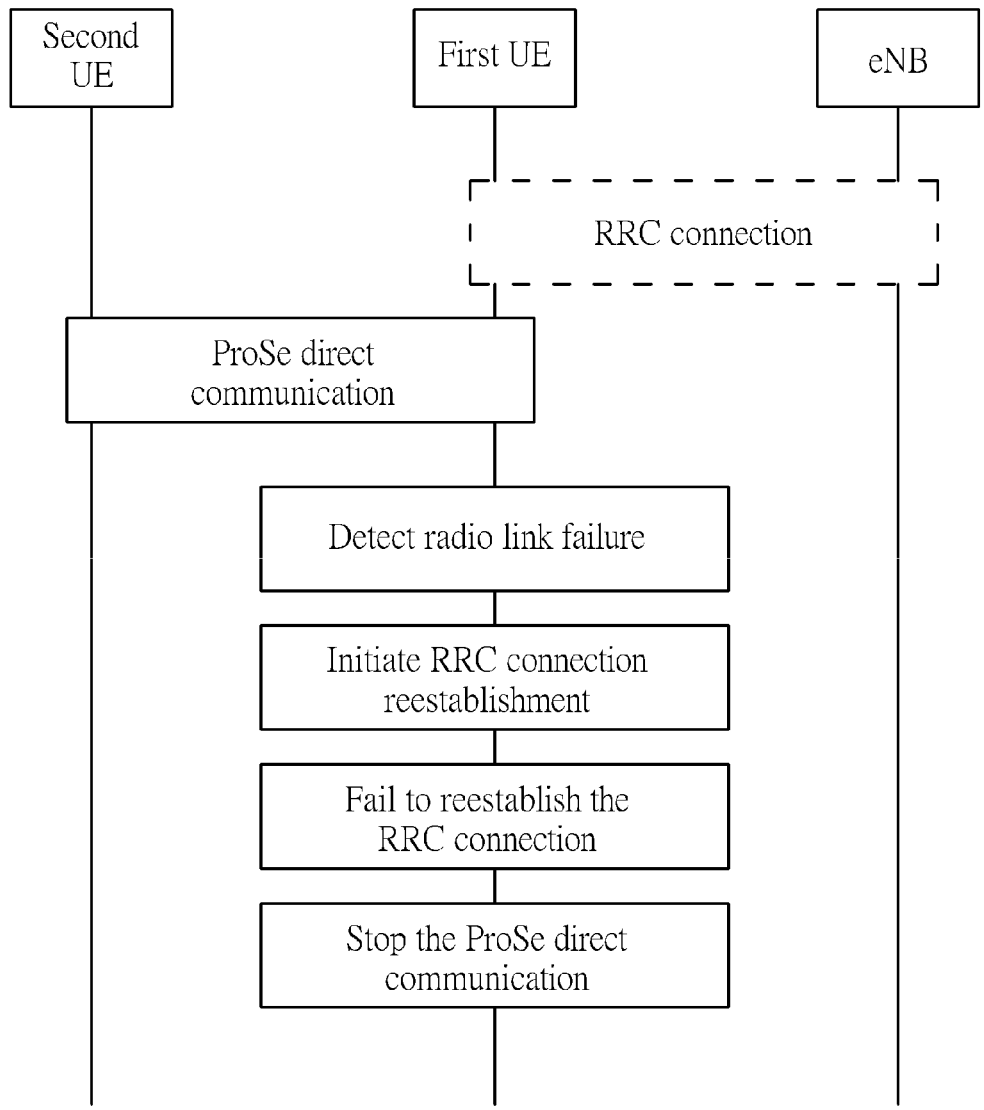
FIG. 10 illustrates a signaling diagram of an example of the process shown in FIG. 9.

According to the process 90, the first UE (e.g. UE 402) establishes an RRC connection to a first network (e.g. eNB 4002) and perform a ProSe communication with a second UE (e.g. UE 404); that is, UE 402 and UE 404 are in a ProSe communication mode. When a connection failure occurs in the RRC connection with the eNB 4002, the UE 402 may initiate an RRC connection reestablishment procedure. Note that the connection failure may be a radio link failure, a handover failure, a mobility from Evolved Universal Terrestrial Radio Access (E-UTRA) failure, an integrity check failure indication from lower layers, or an RRC connection reconfiguration failure with the eNB 4002. And, when the UE detects the connection failure occurs in the RRC connection, the UE 402 stops or releases the ProSe communication with the UE 404. An example of the process 90 illustrated in a signaling diagram is shown in FIG. 10. In such a situation, the UE 402 may prevent from keeping communicating with the UE 404 without the control of eNB 4002 or keeping monitoring signals from the UE 404 without receiving scheduling command (e.g. uplink grant) from the eNB 4002. Therefore, the battery power of the UE 402 is saved.

Furthermore, after stopping or releasing the ProSe communication with the UE 404, the UE 402 may send a first signal indicating the UE 404 to stop the ProSe communication or informing the failure or loss of the RRC connection. The first signal may be, for example, a Radio Resource Control (RRC) message, a Medium Access Control (MAC) Control Element or a physical layer control signal.

After receiving the first signal from the UE 402, the UE 404 may send a second signal indicating the eNB 4002 (or, in the case of FIG. 5, the eNB 5004) that the ProSe communication is stopped or released, or informing the failure or loss of the RRC connection. The second signal may be, for example, a Non-Access Stratum (NAS) message, a Radio Resource Control (RRC) message, a Medium Access Control (MAC) Control Element or a physical layer control signal. In response to the second signal, the eNB 4002 (or the eNB 5004) releases resources for the ProSe communication. Alternatively, after receiving the first signal from the UE 402, the UE 404 may stop or release the ProSe communication directly; or, the UE 404 may initiate release of the ProSe communication by sending a request to a network which controls the UE 404. For example, the UE 404 has an RRC connection with the eNB 4002 in FIG. 4 or the UE 504 has an RRC connection with the eNB 5004 in FIG. 5, so the UE 404/504 sends the request to the eNB 4002/5004. In response to the request from the UE 404/504, the eNB 4002/5004 may release resources for the ProSe communication and send back a response to the E 404/504. The request and the response may be, for example, a NAS message, an RRC message, a MAC Control Element, or a physical layer control signal.

Note that, in the above example, the release of the ProSe communication is initiated by the UE 404. In another example, after receiving the second signal indicating that the ProSe communication is stopped or released, the eNB 4002/5004 may initiate release of the ProSe communication by sending a third signal to the UE 404/504 to release a configuration of the ProSe communication. The third signal may be, for example, a NAS message, an RRC message, a MAC Control Element, or a physical layer control signal.

Figure 11:
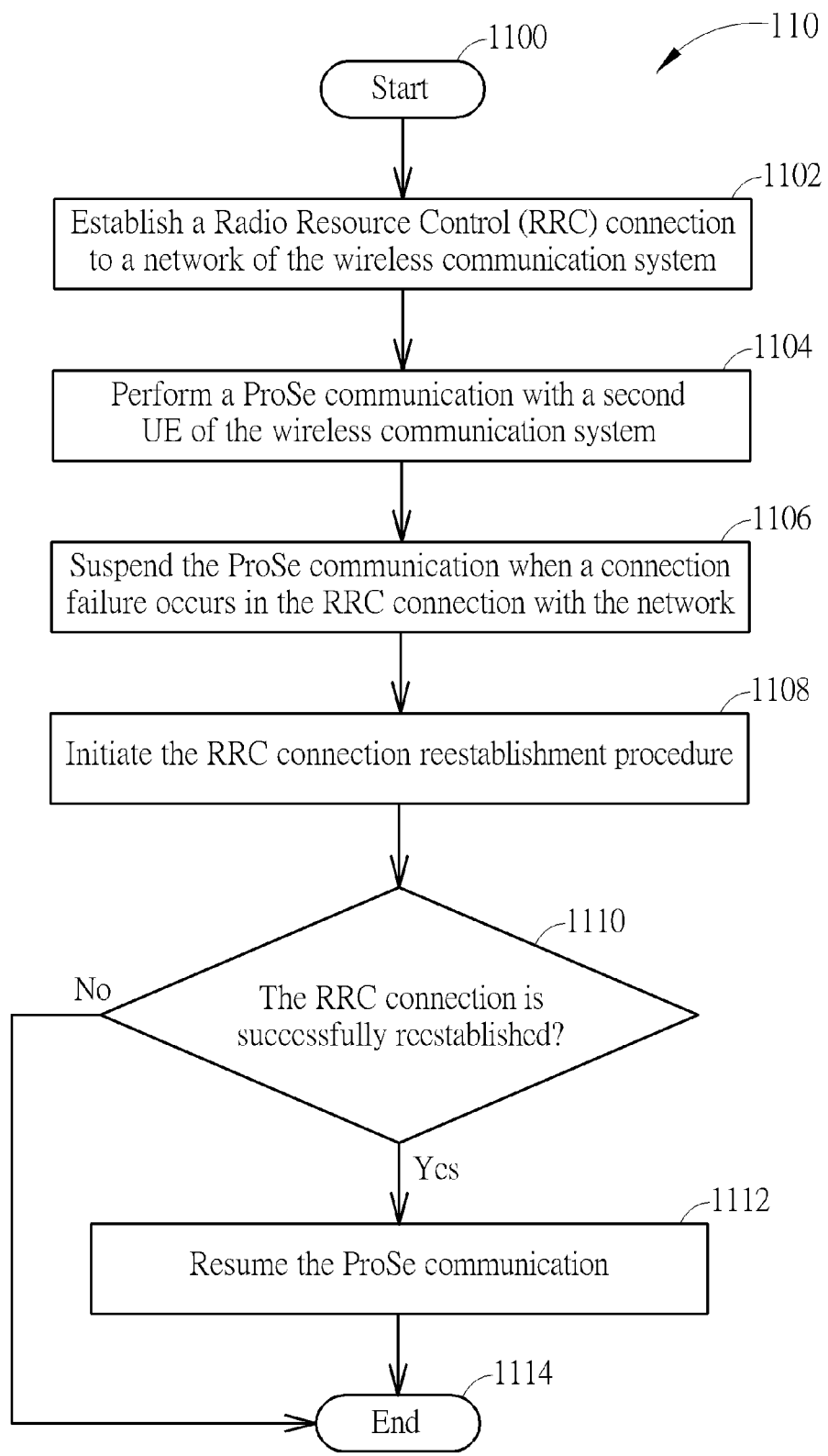
FIG. 11 is a flowchart of a process according to an example of the present invention.

Please refer to FIG. 11, which is a flowchart of a process 110 according to an example of the present invention. The process 110 is utilized for a first UE to handle device-to-device communications, i.e. ProSe communications of direct data path type (which is called ProSe communication in short) in the wireless communication system 40 or 50. The process 110 is implemented by the communication device 60 and may be compiled into the program code 614 to instruct the processing means 600 to execute the following steps:

Step 1100: Start.

Step 1102: Establish a Radio Resource Control (RRC) connection to a network of the wireless communication system.

Step 1104: Perform a ProSe communication with a second UE of the wireless communication system.

Step 1106: Suspend the ProSe communication when a connection failure occurs in the RRC connection with the network.

Step 1108: Initiate the RRC connection reestablishment procedure.

Step 1110: The RRC connection is successfully reestablished? If yes, go to Step 1112; otherwise, go to Step 1114.

Step 1112: Resume the ProSe communication.

Step 1114: End.

According to the process 110, the first UE (e.g. UE 402) establishes an RRC connection to a network (e.g. eNB 4002) and performs a ProSe communication with a second UE (e.g. UE 404). When a connection failure occurs in the RRC connection, the UE 402 first suspends (or stops) the ProSe communication with the UE 404 (as Step 1106), then initiates the RRC connection reestablishment procedure (as Step 1108). Note that the connection failure may be a radio link failure, a handover failure, a mobility from Evolved Universal Terrestrial Radio Access (E-UTRA) failure, an integrity check failure indication from lower layers, or an RRC connection reconfiguration failure with the eNB 4002.

Figure 12:
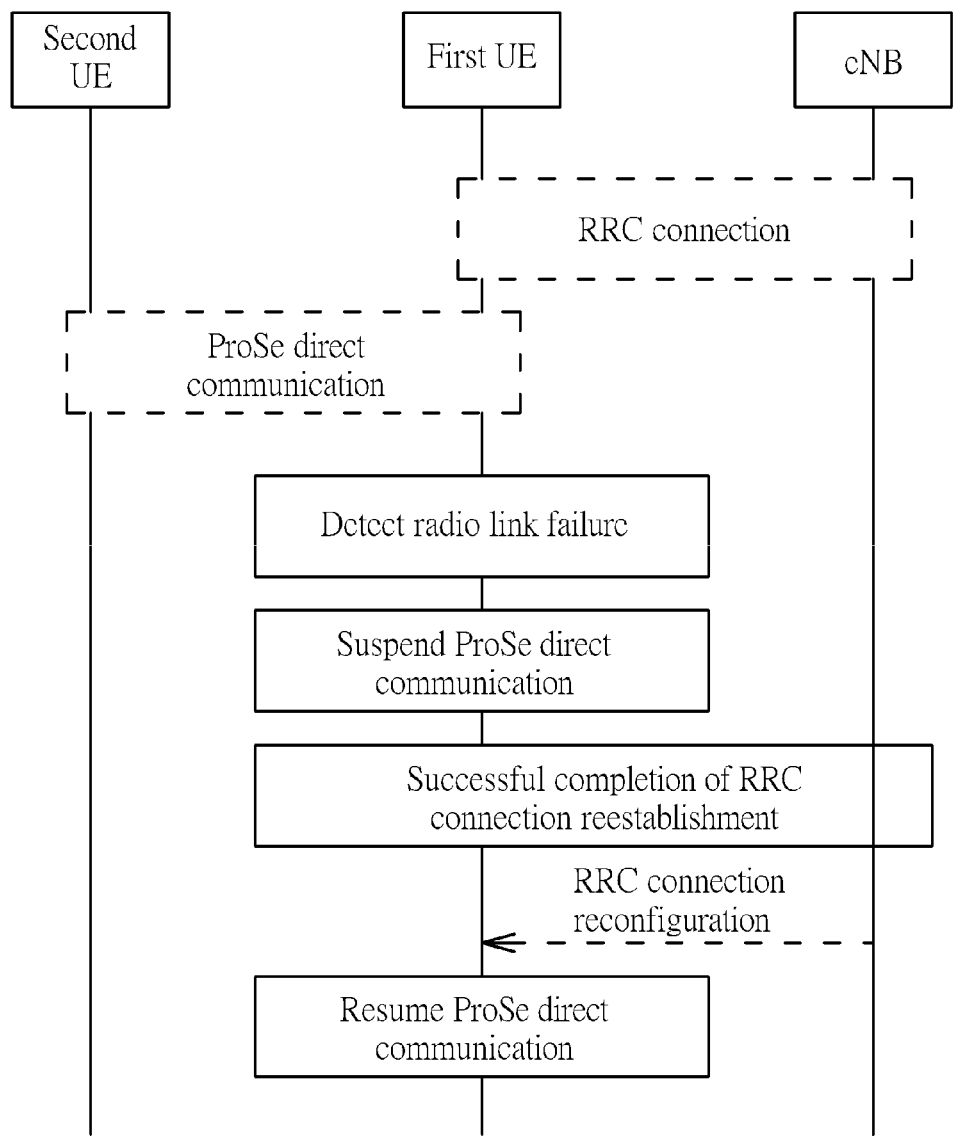
FIG. 12 illustrates a signaling diagram of an example of the process shown in FIG. 11.

When the UE 402 performs the RRC connection reestablishment procedure successfully (as Step 1110), or when the UE 402 receives a first RRC connection reconfiguration message (i.e. RRCConnectionReconfiguration) after successful completion of the RRC connection reestablishment procedure, the UE 402 resumes the ProSe communication (as Step 1112). An example of the process 110 illustrated in a signaling diagram is shown in FIG. 12. In such a situation, the UE 402 may successfully resume or continue the ProSe communication after recovering the RRC connection with the eNB 4002.

Note that, one of the objectives of the present invention is to prevent the UEs from wasting power due to a connection failure, and the process 110 is an example of the present invention. Those skilled in the art should readily make combinations, modifications and/or alterations on the abovementioned description and examples. For example, an RRC message, e.g. RRCConnectionReconfiguration message, may configure the ProSe communication. In other words, the ProSe communication may be configured or re-configured according to the first RRC connection reconfiguration message received from the eNB 4002.

Alternatively, the UE 402 may keep a configuration of the ProSe communication when a connection failure, e.g. a radio link failure, a handover failure, a mobility from Evolved Universal Terrestrial Radio Access (E-UTRA) failure, an integrity check failure indication from lower layers, or an RRC connection reconfiguration failure with the network, occurs. Moreover, the UE 402 may send a first signal indicating the UE 404 to suspend the ProSe communication. The UE 404 may suspend the ProSe communication in response to the first signal. If the UE 404 suspends the ProSe communication, the UE 402 may send a second signal indicating the UE 404 to resume the ProSe communication. The first and the second signals may be, for example, an RRC message, a MAC Control Element, or a physical layer control signal.

Figure 13:
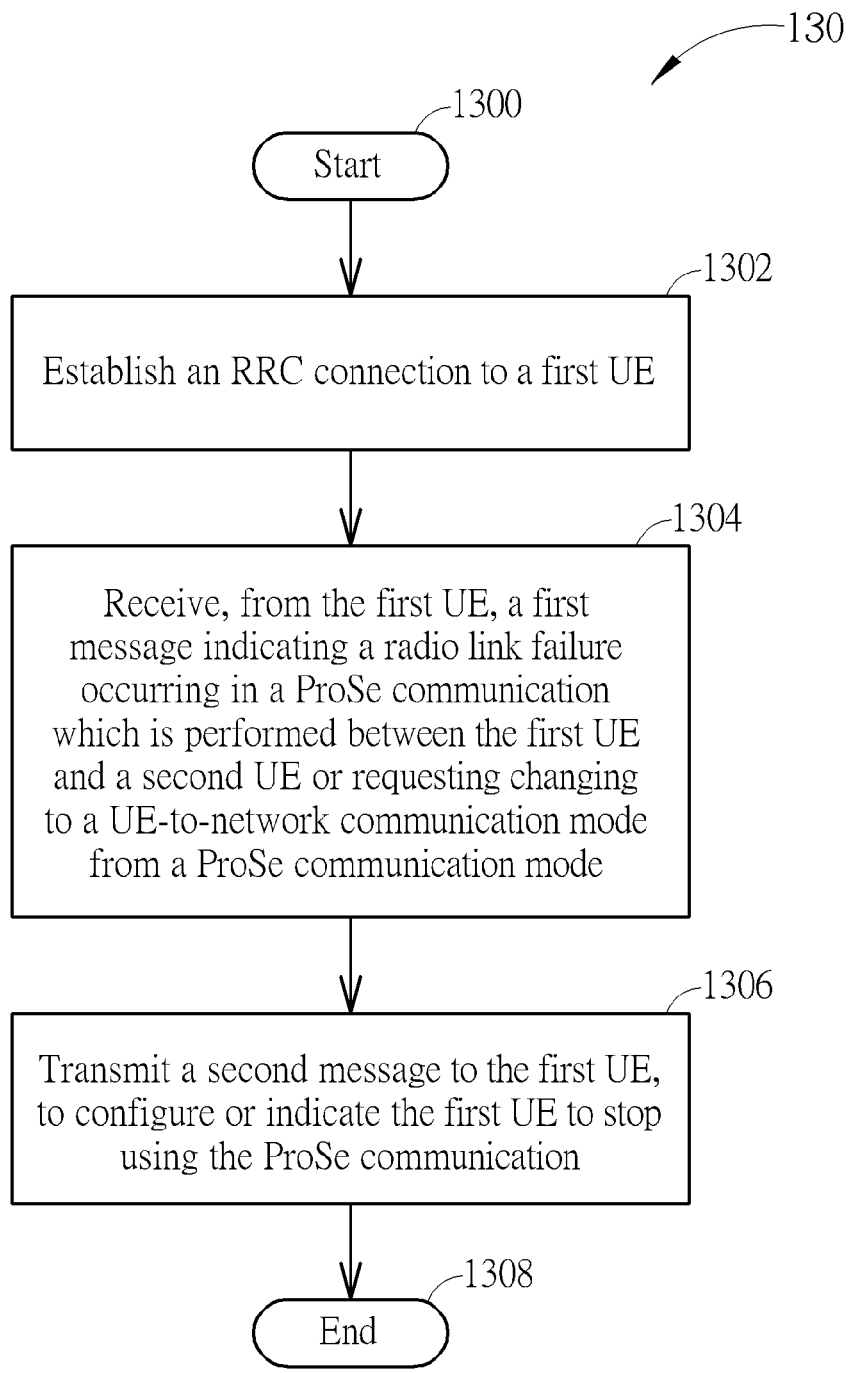
FIG. 13 is a flowchart of a process according to an example of the present invention.

Please refer to FIG. 13, which is a flowchart of a process 130 according to an example of the present invention. The process 130 is utilized for a network, corresponding to the process 70, to handle direct communications for UEs, such as device-to-device communications or ProSe communications of direct data path type (which is called ProSe communication in short) in the wireless communication system 40 or 50. The process 130 is implemented by the communication device 60 and may be compiled into the program code 614 to instruct the processing means 600 to execute the following steps:

Step 1300: Start.

Step 1302: Establish an RRC connection to a first UE.

Step 1304: Receive, from the first UE, a first message indicating a radio link failure occurring in a ProSe communication which is performed between the first UE and a second UE or requesting changing to a UE-to-network communication mode from a ProSe communication mode.

Step 1306: Transmit a second message to the first UE, to configure or indicate the first UE to stop using the ProSe communication.

Step 1308: End.

Figure 14:
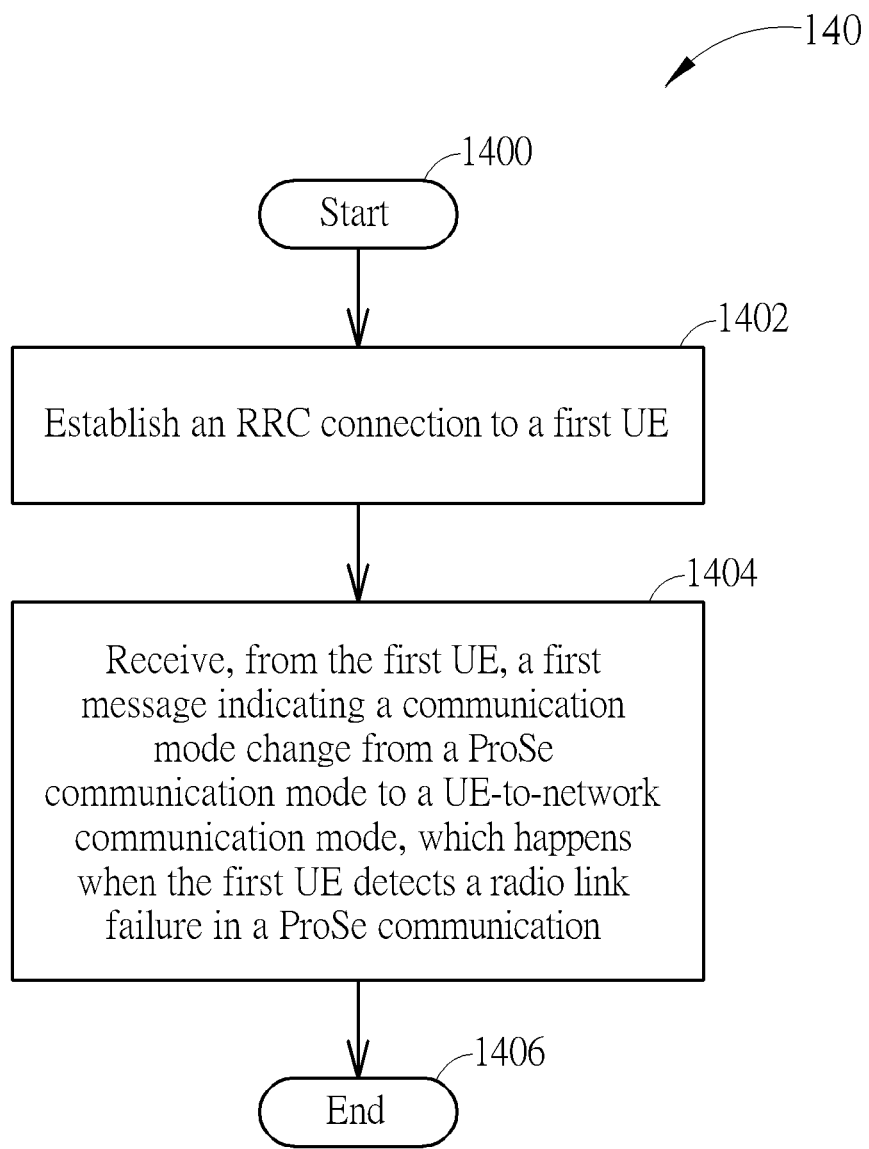
FIG. 14 is a flowchart of a process according to an example of the present invention.

Please refer to FIG. 14, which is a flowchart of a process 140 according to an example of the present invention. The process 140 is utilized for a network, corresponding to the process 80, to handle direct communications for UEs, such as device-to-device communications or ProSe communications of direct data path type (which is called ProSe communication in short) in the wireless communication system 40 or 50. The process 140 is implemented by the communication device 60 and may be compiled into the program code 614 to instruct the processing means 600 to execute the following steps:

Step 1400: Start.

Step 1402: Establish an RRC connection to a first UE.

Step 1404: Receive, from the first UE, a first message indicating a communication mode change from a ProSe communication mode to a UE-to-network communication mode, which happens when the first UE detects a radio link failure in a ProSe communication.

Step 1406: End.

The processes 130 and 140 are corresponding actions in the network, which can be understood by those skilled from the above mentioned processes 70 and 80. Those skilled can refer to the descriptions of the processes 70 and 80, and thus detailed descriptions for the processes 130 and 140 are omitted herein To sum up, the present invention provides a method for handling device to device communication so as to prevent the communication device from wasting unnecessary power due to a radio link problem.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method of handling device to device communication for a first user equipment (UE) in a wireless communication system, the method comprising:

establishing a Radio Resource Control (RRC) connection to a network of the wireless communication system;

performing a proximity-based services (ProSe) communication of direct data path type with a second UE of the wireless communication system;

suspending the ProSe communication when a connection failure occurs in the RRC connection with the network;

sending, to the second UE, a first signal indicating the second UE to suspend the ProSe communication when the connection failure occurs in the RRC connection with the network; and sending, to the second UE, a second signal indicating the second UE to resume the ProSe communication after the first UE resumes the ProSe communication.

2. The method of claim 1, further comprising:

resuming the ProSe communication when the first UE performs the RRC connection reestablishment procedure successfully or when the first UE receives a first RRC connection reconfiguration message from the network after successful completion of the RRC connection reestablishment procedure.

3. The method of claim 1, further comprising:

keeping a configuration of the ProSe communication when a radio link failure, a handover failure, a mobility from Evolved Universal Terrestrial Radio Access (E-UTRA) failure, an integrity check failure indication from lower layers, or an RRC connection reconfiguration failure with the network occurs.

4. A first communication device for handling device to device communication in a wireless communication system, comprising:

a processing means; and a storage unit, for storing a program instructing the processing means to perform a process for handling device to device communication, wherein the process comprises the following steps:

establishing a Radio Resource Control (RRC) connection to a network of the wireless communication system;

performing a proximity-based services (ProSe) communication of direct data path type with a second communication device of the wireless communication system;

suspending the ProSe communication when a connection failure occurs in the RRC connection with the network;

sending, to the second communication device, a first signal indicating the second communication device to suspend the ProSe communication when the connection failure occurs in the RRC connection with the network; and sending, to the second communication device, a second signal indicating the second communication device to resume the ProSe communication after the first communication device resumes the ProSe communication.

5. The first communication device of claim 4, wherein the process further comprises:

resuming the ProSe communication when the first communication device performs the RRC connection reestablishment procedure successfully or when the first communication device receives a first RRC connection reconfiguration message from the network after successful completion of the RRC connection reestablishment procedure.

6. The first communication device of claim 4, wherein the process further comprises:

keeping a configuration of the ProSe communication when a radio link failure, a handover failure, a mobility from Evolved Universal Terrestrial Radio Access (E-UTRA) failure, an integrity check failure indication from lower layers, or an RRC connection reconfiguration failure with the network occurs.

* * * * *